United States Patent
Chandwani et al.

(10) Patent No.: US 9,980,272 B2
(45) Date of Patent: May 22, 2018

(54) MITIGATING INTERFERENCE TO EMBMS SERVICES IN HETNET DEPLOYMENTS

(71) Applicant: Verizon Patent and Licensing Inc., Arlington, VA (US)

(72) Inventors: Rakesh Chandwani, Morganville, NJ (US); Shankar Venkatraman, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 14/869,259

(22) Filed: Sep. 29, 2015

(65) Prior Publication Data
US 2017/0094669 A1    Mar. 30, 2017

(51) Int. Cl.
  *H04W 72/08* (2009.01)
  *H04W 4/06* (2009.01)
  *H04W 72/00* (2009.01)
  *H04L 12/18* (2006.01)

(52) U.S. Cl.
  CPC ........... *H04W 72/082* (2013.01); *H04W 4/06* (2013.01); *H04W 72/005* (2013.01); *H04L 12/189* (2013.01)

(58) Field of Classification Search
  CPC ... H04W 72/082; H04W 4/06; H04W 72/005; H04L 12/189
  See application file for complete search history.

(56) References Cited

U.S. PATENT DOCUMENTS

| | | | | |
|---|---|---|---|---|
| 8,660,049 | B2 * | 2/2014 | Katayama | H04L 5/0032 370/312 |
| 8,693,953 | B2 * | 4/2014 | Aguirre | H04W 4/021 370/329 |
| 2010/0136996 | A1 * | 6/2010 | Han | H04W 24/02 455/452.1 |
| 2011/0261743 | A1 * | 10/2011 | Futaki | H04W 72/0426 370/312 |
| 2013/0225179 | A1 * | 8/2013 | Jul | H04W 16/16 455/438 |
| 2015/0180676 | A1 * | 6/2015 | Bao | H04L 12/1886 370/230 |

* cited by examiner

*Primary Examiner* — Alex Skripnikov
*Assistant Examiner* — Sharmin Chowdhury (57) ABSTRACT

Techniques described herein relate to the dynamic modification of the serving band used by small cells in a heterogeneous network (HetNet) environment. The serving band may be modified to mitigate interference with macrocell eMBMS services. In various implementations, and based on scheduled eMBMS services, a small cell may switch the frequency band of the small cell, suspend service, and/or reduce the transmit power of the small cell.

16 Claims, 9 Drawing Sheets

MITIGATING INTERFERENCE TO EMBMS SERVICES IN HETNET DEPLOYMENTS

BACKGROUND

The use of wireless networks, to support mobile data communications, continues to grow rapidly. One trend in the implementation of cellular wireless networks is the increasing reliance on heterogeneous networks (HetNets). A heterogeneous cellular network may include traditional macrocell base stations overlaid with small cells (femtocells, picocells, wireless relays, etc.). The small cells may include, relative to the macrocells, smaller form factor and lower power radio nodes. By deploying HetNets with targeted small cell installations, network operators can offload users from macrocells to small cells. This technique may be particularly useful in areas with poor radio reception and/or dense mobile device populations.

eMBMS (enhanced Multimedia Broadcast Multicast Service) is a point-to-multipoint interface specification for existing and upcoming Third Generation Partnership Project (3GPP) cellular networks, which is designed to provide efficient delivery of broadcast and multicast services, both within a cell as well as over multiple cells. eMBMS services may be provided using pre-defined sub-frames, on a particular frequency band, across all the base stations in the eMBMS coverage area. A base station that does not participate in eMBMS may cause interference to the eMBMS service when it uses the eMBMS frequency band for non-eMBMS communications. Interference may reduce the signal-to-interference-plus-noise ratio (SINR) in the eMBMS coverage area. Accordingly, in 3GPP Long Term Evolution (LTE) networks, care is taken that base station in the eMBMS service area do not opt out from providing eMBMS service, so that the overall eMBMS SINR stays high.

With the advent of HetNet deployments using small cells of differing capabilities (e.g. femtocells or low power picocells), there is potential for disruption to uniform eMBMS service due to the lack of equipment feature parity, network connectivity etc. This is especially true in high density urban populations, which otherwise may be an ideal environment for deployment of broadcast services such as eMBMS as well as femtocells to increase coverage and capacity in select areas. Femtocells, however, due to relatively high latency connections with the LTE core network and/or due to other reasons such as cost considerations, may not be capable of participating in eMBMS services. Thus, when an eMBMS service is deployed in such an area, the femtocells may create "islands" where no eMBMS service can be offered and, in fact, can cause interference to the eMBMS service in the vicinity.

DETAILED DESCRIPTION OF PREFERRED EMBODIMENTS

The following detailed description refers to the accompanying drawings. The same reference numbers in different drawings may identify the same or similar elements.

Techniques described herein relate to the dynamic modification of the serving band used by small cells in a HetNet environment. A small cell, such as a femtocell, may include the ability to provide service, to User Equipment (UE) devices, on two or more different frequency bands. In one implementation, the small cell may receive scheduling information relating to when eMBMS services are to be provided near the small cell. The scheduling information may include, for example, the frequency band used by the eMBMS service and an indication of the when the eMBMS service is to be provided. In response, the small cell may select a frequency band to use, during the multicast/broadcast, that does not interfere with the frequency band used by the multicast/broadcast service.

In some implementations, the small cell may use measurements relating to the signal strength of the eMBMS service and subsequently the potential of interference that small cell can create when determining whether to dynamically modify the serving band used by the small cell. For example, the small cell may measure the signal strength of a particular frequency band on which eMBMS service is to be provided by one or more macrocells. If the signal strength is below a threshold, which may potentially indicate that the eMBMS service may be poor anyway or unusable for UEs in the vicinity of the small cell, the small cell may forgo switching of the frequency band and may thus continue to use the same frequency band that is being used by the eMBMS service.

In some situations, the physical capabilities of the small cell may not allow the small cell to switch frequency bands to a band that does not interfere with eMBMS service that is being provided by the macrocell(s). In these implementations, the small cell may decide to suspend service by disabling transmission for the period corresponding to the eMBMS service. Alternatively or additionally, to minimize interference, the small cell may adjust transmit power levels to minimize interference with the eMBMS service.

Figure 1A:
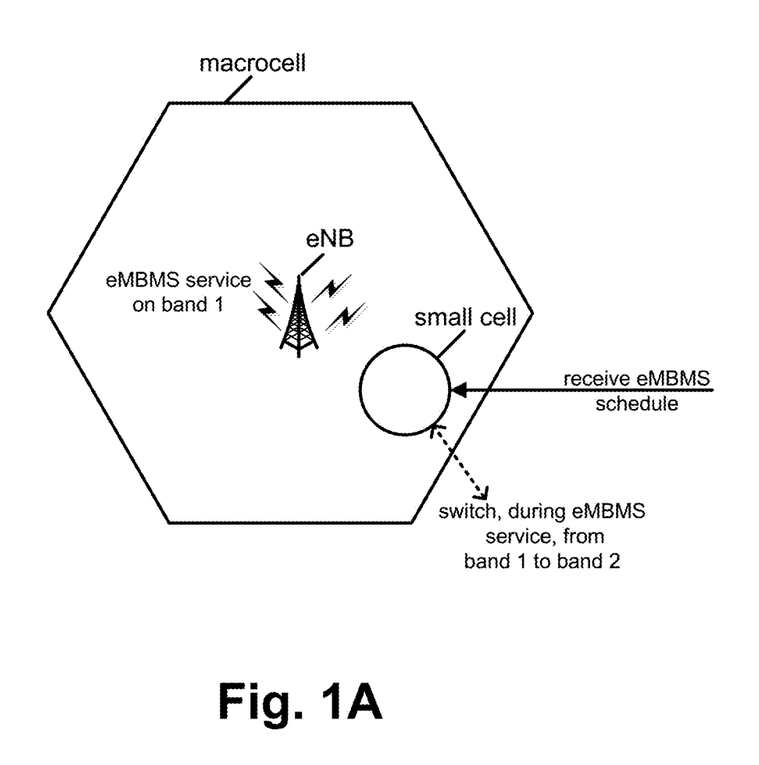
FIGS. 1A, 1B, and 1C are diagrams illustrating an example overview of implementations described herein.
Figure 1B:
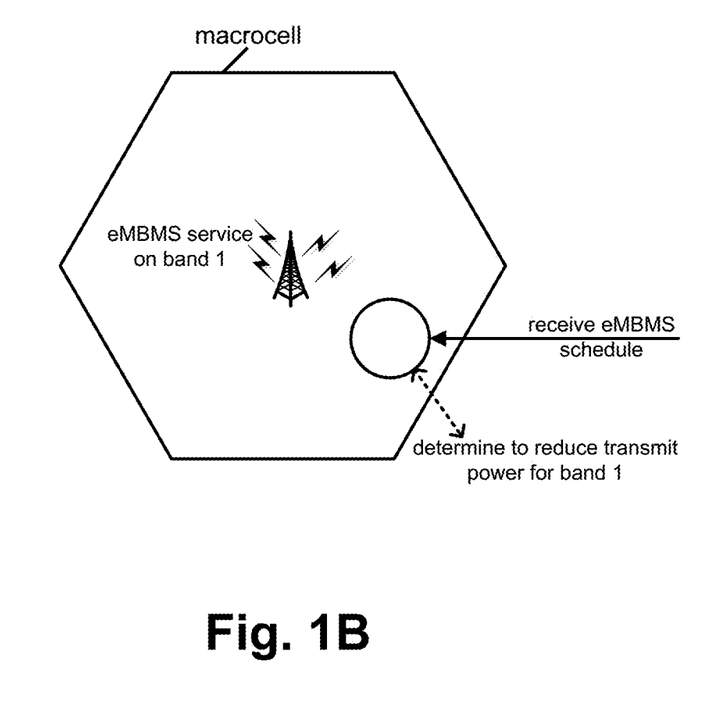
Figure 1C:
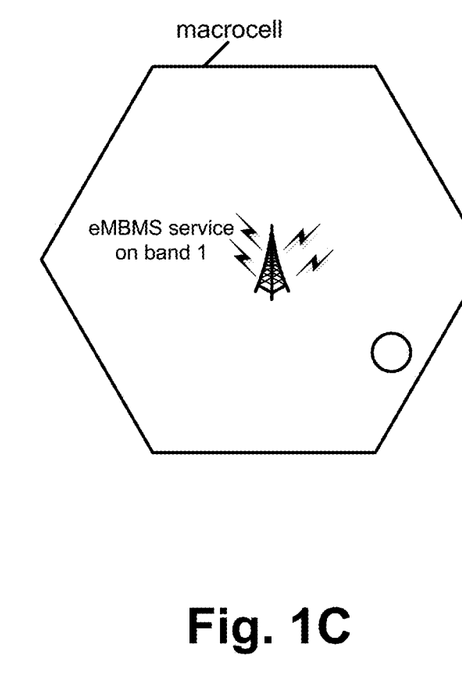

FIGS. 1A, 1B, and 1C are diagrams illustrating an example overview of implementations described herein. As shown in FIG. 1A, a macrocell in a cellular wireless network may be provided by a base station, which may be referred to as an Evolved Node B (eNB) in LTE networks. A small cell is illustrated as providing supplemental coverage within the coverage area of the macrocell.

In FIG. 1A, assume that the small cell may include the ability to provide unicast service on two or more different frequency bands. The small cell may receive an eMBMS schedule ("receive eMBMS schedule"), which may indicate dates/times and frequency bands of upcoming eMBMS service transmissions. The schedule may be received over a signaling link from an eMBMS management device associate with the wireless cellular network. The small cell may determine whether the frequency band being used by the small cell will interfere with the scheduled eMBMS services. If so, the small cell may switch the frequency band to a band that is does not interfere with the scheduled eMBMS services ("switch, during eMBMS service, from band 1 to band 2"). In some implementations, at the end of the scheduled eMBMS service, the small cell may switch back to the original frequency band that was being used by the small cell (e.g., "band 1").

In some implementations, the decision to switch the frequency band that is being used by the small cell may additionally be based on a determination that the signal strength of the macrocell, as received in the coverage area of the small cell, is above a threshold. That is, if the small cell covers an area (such as in a building) that receives poor macrocell coverage, such that the eMBMS service may not be useable anyway, the small cell may refrain from switching the frequency band. Alternatively or additionally, instead of switching frequency bands, the small cell may suspend service on a frequency band (e.g., in situations where the small cell does not have the capability to switch frequency bands).

FIGS. 1B and 1C illustrate another possible implementation, described herein, in which a small cell may reduce transmit power to resolve conflicts with eMBMS services provided by the macrocell. The small cell may receive an eMBMS schedule ("receive eMBMS schedule"), which may indicate dates/times and frequency bands of upcoming eMBMS service transmissions. The small cell may determine whether the frequency band being used by the small cell will interfere with the scheduled eMBMS services. If so, the small cell may reduce the transmit power of the small cell. As shown in FIG. 1C, after reducing the transmit power, the coverage area of the small cell may be reduced. Accordingly, the potential interference of the small cell, on the eMBMS transmission, may be reduced. At the end of the eMBMS transmission, the small cell may increase the transmit power back to the original level.

Figure 2:
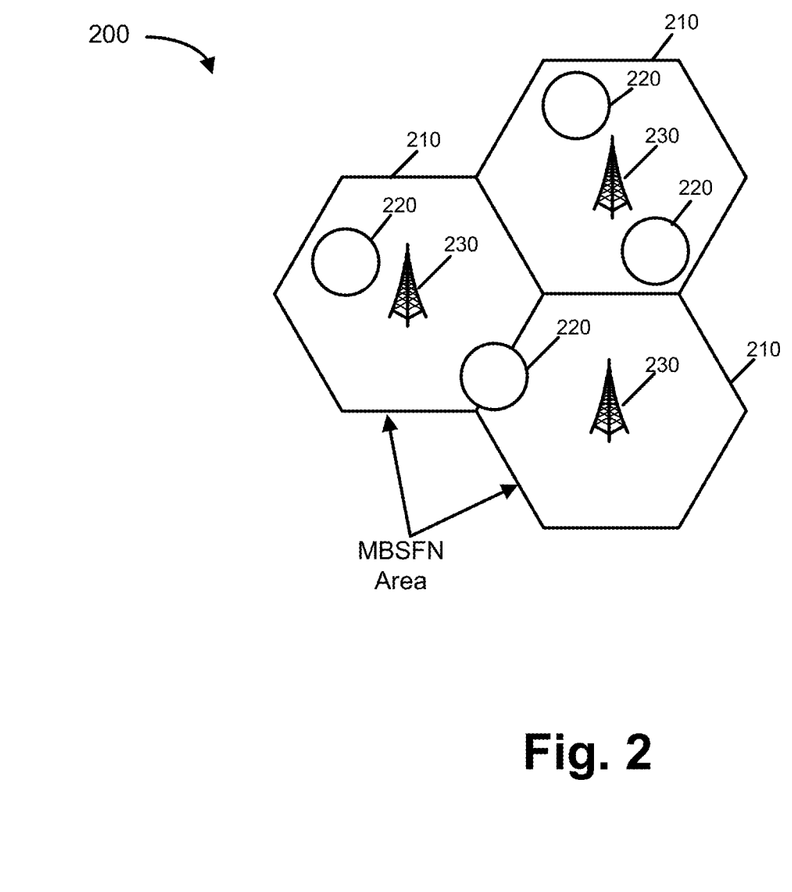
FIG. 2 is a diagram illustrating an example implementation of an LTE Radio Access Network (RAN)

FIG. 2 is a diagram illustrating an example implementation of an LTE RAN 200. As illustrated, LTE RAN 200 may include macrocells 210 and small cells 220. That is, LTE RAN 200 may be a HetNet. Macrocells 210 may be provided by radio nodes such as eNBs 230. Each macrocell 210 may cover a relatively large area (e.g., a typical cell radius may be on the order of 500 meters to a kilometer). A macrocell 210 may provide service to all users of a particular wireless network. Small cells 220, on the other hand, may be provided by low-power radio nodes, such as femtocells (also called Home eNodeBs (HeNBs)) and picocells. Small cell 220 may include "closed" cells that provide service to a limited subset of users of the wireless network ("white-list" users) or "open" cells that provide service to all users of the particular wireless network. Small cells 220 may be deployed, by operators of the wireless network, to enhance or supplement the service areas of the wireless network. In some implementations, small cells 220 may include the ability to provide service on one of multiple frequency bands. Small cells 220 may also include a "sniffer" receiver via which the small cell can measure the current signal strength, due to eNBs 230, on one or more frequency bands. Macrocells 210 and small cells 220 may be deployed using the same radio frequency channel or same set of radio frequency channels.

In eMBMS, macrocells 210, associated with eNBs 230, may be grouped to obtain Multimedia Broadcast Multicast Service Single Frequency Network (MBSFN) areas. Multicast data channels in a MBSFN area may be synchronized so that identical multicast radio signals may be generated, at the same time, for multiple macrocells 210. For example, MBSFN areas may be defined that cover the area associated with multiple ones of the illustrated macrocells (e.g., two of the three macrocells).

Figure 3:
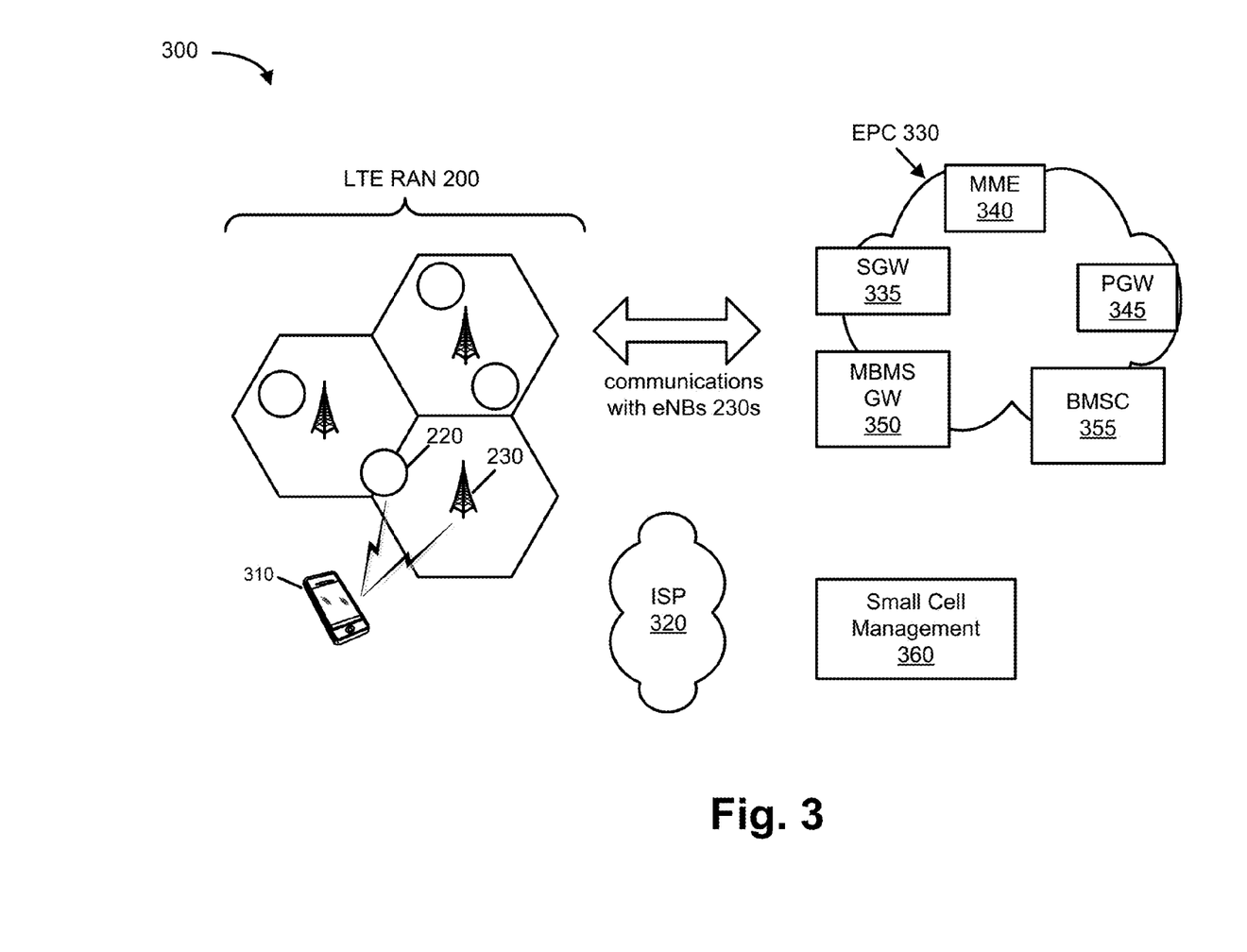
FIG. 3 is a diagram of an example telecommunications network in which systems and/or methods described herein may be implemented.

FIG. 3 is a diagram of an example telecommunications network 300 in which systems and/or methods described herein may be implemented. In general, telecommunications network 300 may include an evolved packet system (EPS) that includes an LTE RAN, an evolved packet core (EPC), and/or an Internet protocol (IP) multimedia subsystem (IMS) core that operates based on a 3GPP wireless communication standard. As shown in FIG. 3, telecommunications network 300 may include LTE RAN 200 (described previously with respect to the description of FIG. 2), User Equipment (UE) 310, Internet Service Provider (ISP) network 320, EPC 330, and small cell management server 360. EPC 330 may include serving gateway (SGW) 335, mobility management entity device (MME) 340, packet data network (PDN) gateway (PGW) 345, MBMS gateway (GW) 350, and broadcast multicast service center (BMSC) 355.

UE 310 may include a portable computing and communication device, such as a personal digital assistant (PDA), a smart phone, a cellular phone, a laptop computer with connectivity to a cellular wireless network, a wearable device, a tablet computer, etc. UE 310 may also include a non-portable computing device, such as a desktop computer, a consumer or business appliance, or another device that has the ability to connect to telecommunications network 300. UEs 310 may wirelessly communicate with telecommunications network 310 using both macrocells 210 and small cells 210.

ISP network 320 may include a network that is managed and/or owned by a network service provider that is different than the network provider that provides the wireless cellular network (i.e., LTE RAN 200 and EPC 330) that serves UE 310. ISP network 320 may include a packet data network (PDN) that may be implemented using one or more wired and/or wireless networks. ISP network 320 may connect the small cells 220 to external networks, such as EPC network 330. In some implementations, only some of small cells 220 may obtain network connectivity via ISP network 320. That is, a portion of small cells 220 may obtain network connectivity via ISP network 320 and another portion may be directly connected to EPC 330. In general, UE network traffic via small cells 220, and through ISP network 320, may have a higher latency than UE traffic through eNBs 230. The higher latency may make eMBMS service, through small cells 220, either impractical or undesirable.

EPC network 330 may implement backhaul and control functionality for LTE RAN 200. EPC network 330 may be implemented as a packet-based "flat architecture." SGW 335 may be a part of EPC network 330 and may include one or more computation and communication devices that route and forward user data packets. SGW 335 may also act as a mobility anchor during inter-eNB handoffs. MME 340 may include one or more computation and communication devices that perform signaling for telecommunications network 300. MME 340 may, for example, be responsible for authenticating UE 310, maintaining location information for UE 310, and selecting a PGW 345 to service a particular UE 310. PGW 345 may include one or more computation and communication devices that provide connectivity from UE 310 to external packet data networks.

MBMS GW 350 may include one or more computation or communication devices that provide for the coordination of the sending of multicast or broadcast data to eNBs 230. MBMS GW 320 may receive the content, that is to be broadcast, from BMSC 355. MBMS GW 350 may transmit eMBMS data plane traffic ("IP Multicast Data") to eNBs 230.

BMSC 355 may include one or more computation or communication devices that provide for the coordination of multicast using eMBMS. BMSC 355 may perform functions relating to authorization, charging, and assignment of communication channels. For example, BMSC 355 may assign a particular number of multicast data channels for various multicast content streams. BMSC 355 may also receive content, such as from an external content provider. BMSC 355 may forward the received content as part of a multicast transmission.

Small cell management server 360 may include one or more devices that provide management and/or provisioning services relating to the heterogeneous network. For example, small cell management server 360 may control and/or provision small cells 220. In some implementations, all control signaling associated with small cells 220 may be performed through small cell management server 360. In other implementations, other network devices, such as devices associated with EPC 330, may directly communicate with small cells 220 to perform control signaling (i.e., without using small cell management server 360).

Although illustrated as being located externally to EPC 330, in some implementations, small cell management server 360 may be considered to be a part of EPC 330. Similarly, although MBMS GW 350 and BMSC 355 are illustrated as being part of EPC 330, in some implementations, MBMS GW 350 and BMSC 355 may be implemented externally to EPC 330.

Although FIGS. 2 and 3 illustrate example components of telecommunications network 300, in other implementations, telecommunications network 300 may contain fewer components, different components, differently arranged components, or additional components than those depicted in FIGS. 2 and 3. Alternatively, or additionally, one or more components of telecommunications network 300 may perform one or more other tasks described as being performed by one or more other components of telecommunications network 300.

Figure 4A:
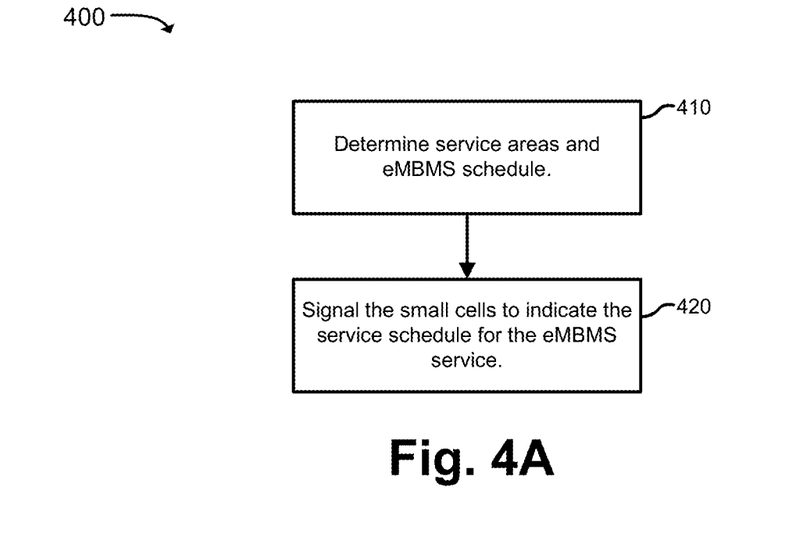
FIGS. 4A, 4B, 5, 6, and 7 are flowcharts illustrating example processes for mitigating interference to eMBMS services in a HetNet.
Figure 4B:
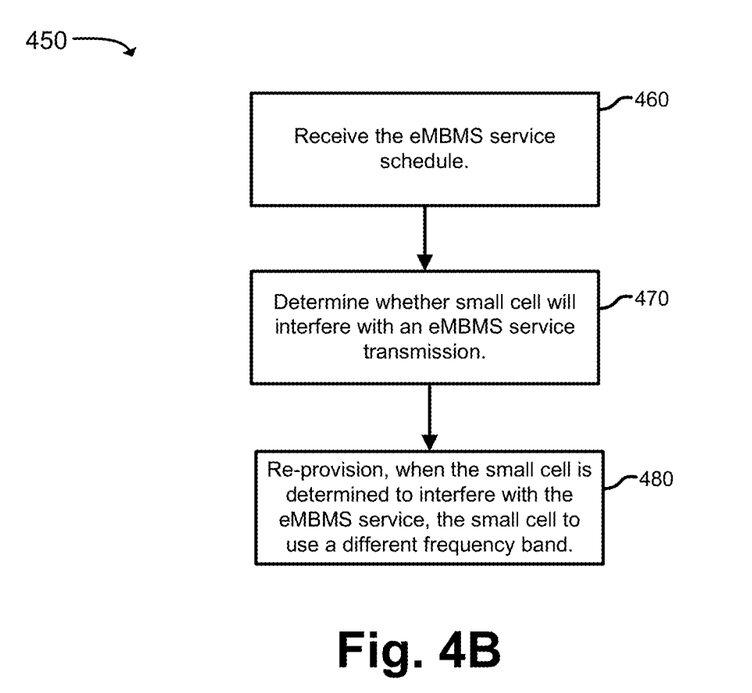

FIGS. 4A and 4B are flowcharts illustrating example processes 400 and 450, respectively, for mitigating interference to eMBMS services in a HetNet. In one implementation, the process of FIG. 4A may be implemented by the eMBMS provisioning system, such as by MBMS gateway 350 and/or BMSC 355, and the process of FIG. 4B may be implemented by a small cell 220.

As shown in FIG. 4A, process 400 may include determining the service areas and eMBMS schedule(s) for eMBMS services (block 410). For example, BMSC 355 may receive content, from content providers, and may determine MBSFN areas for which the content is to be multicast. As previously mentioned, the MBSFN areas may correspond to one or more macrocells 210 that are served by one or more eNBs 230.

Process 400 may further include signaling the small cells to indicate the service schedule for the eMBMS service (block 420). Signaling messages may be transmitted using a signaling link with small cells 220. The signaling link may be established over, for example, the 3GPP X2 or S1 interface. Alternatively or additionally, the messages may be transmitted through small cell management server 360, which may act as a relay for the messages.

In one implementation, each signaling message may include: dates, times, and/or duration of one or more eMBMS transmissions; the areas, macrocells, or other information that indicates geographic information associated with the eMBMS transmissions; and identification of the service bands associated with the eMBMS transmissions. The message may be broadcast to all (or a subset of) small cells 220 within a particular geographic area or logical network area. Each small cell 220 that receives the message may examine the message to determine whether the geographic information associated with the eMBMS transmission is relevant to the small cell (i.e., whether the coverage area for the small cell overlaps the coverage area of the eMBMS transmission, as indicated by the geographic information).

Alternatively, or additionally, instead of explicitly including geographic information with the messages, each message may be targeted or directed only to small cells that are known to be in the coverage area of a scheduled eMBMS transmission. In this implementation, a small cell that receives a message may assume that the small cell will interfere with the scheduled eMBMS transmission if the small cell is using the same frequency band for unicast transmission.

Referring to FIG. 4B, process 450 may include receiving the eMBMS service schedule (block 460). Small cell 220 may, for example, receive the signaling message (e.g., the message transmitted in block 420) and may extract the included dates and times of the scheduled eMBMS transmissions; the areas, macrocells, or other information that indicates geographic information associated with the eMBMS transmissions; and the identification of the service bands associated with the eMBMS transmissions.

Process 450 may further include determining whether the small cell will interfere with an eMBMS service (block 470). For example, small cell 220 may compare the location of the small cell with the geographic information associated with eMBMS schedule. Small cell 220 may also compare the current frequency band, being used by the small cell for unicast transmission, to the frequency band for the scheduled eMBMS service. When the location (e.g., coverage area) of small cell 220 overlaps the location of an upcoming eMBMS service and the frequency band used by the small cell overlaps and/or is the same frequency band that will be used for the eMBMS service, small cell 220 may determine that the small cell will interfere with the eMBMS service.

In implementations in which the signaling message does not explicitly include the geographic location of the eMBMS service (e.g., the signaling message is only transmitted to small cells that are known to be in locations that will cause interference), small cell 220 may only need to compare the frequency band being used by the small cell to determine whether the small cell will interfere with eMBMS service.

Process 450 may further include re-provisioning, when the small cell is determined to interfere with eMBMS service, the small cell to use a frequency band that is different than the frequency band of the eMBMS service (block 480). Thus, small cell 220 may re-provision itself to change the LTE unicast serving band to a band that is not the same band as the one on which the eMBMS service is scheduled to operate. Re-provisioning the small cell may include coordinating with attached UEs to change the frequency band before switching to the new frequency band. In some implementations, the signaling message may also include the duration of the eMBMS service. In this situation, small cell 220 can potentially switch the unicast serving band, back to the original unicast serving band, when the eMBMS service ends. By switching the LTE unicast serving bands dynamically, as described with respect to FIGS. 4A and 4B, small cells 220 and the eMBMS service can coexist in the same area and continue to provide communication services to users.

In some implementations, small cell management server 360 may also play a role in determining appropriate bands for small cells 220. For example, small cell management server 360 may also receive the signaling messages that include the eMBMS schedule and may control band selection, by small cells 220, based on the eMBMS schedule. For instance, small cell management server 360 may act to prioritize frequency band usage based on the scheduled eMBMS frequency bands and based on metrics that may be weighted to achieve desired results. Some of the metrics that may be used include: (1) number of devices supported on a given band; (2) local real-time usage statistics for a given band; and (3) local macro coverage for each band. For example, if a particular frequency band, when used by a macrocell, supports a large number of UEs 310 and provides good macro coverage within the macro coverage area, small cell management server 360 may tend to give low priority to that frequency band, for small cell usage, relative to other frequency bands that are not as well utilized for macro coverage.

For some network serving areas, such as indoor areas, macrocell coverage may not be contiguous or may be weak at certain locations within a building. In these situations, small cells 220 are frequently used to supplement coverage of macrocells 210. According to another implementation, described below with respect to FIG. 5, small cell 220 may measure the signal strength associated with macrocells in the vicinity of the small cell. When prevailing macrocell signal strength levels are below a threshold required to sustain good quality eMBMS service, the small cell may selectively choose to forgo participation in band reassignment. This technique is described in more detail below with respect to FIG. 5.

Figure 5:
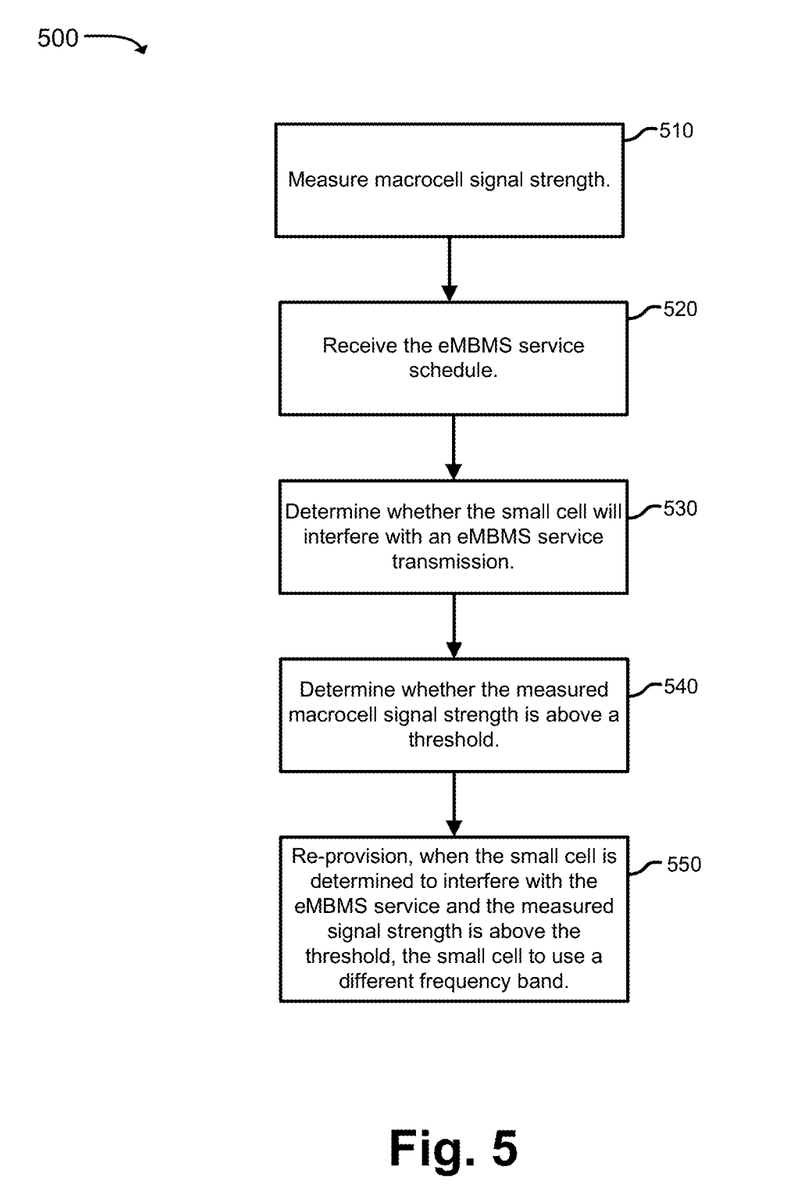

FIG. 5 is a flowchart illustrating an example process 500, according to another implementation, for mitigating interference to eMBMS services in a HetNet. In one implementation, the process of FIG. 5 may be implemented by a small cell 220.

Process 500 and may include measuring the signal strength associated with a macrocell (block 510). For example, small cell 220 may include a "sniffer" antenna or other circuitry that can be used to measure the signal strength that is received, at the small cell, from one or more nearby macrocells. Small cell 220 may periodically or occasionally monitor the signal strength of the nearby macrocells.

Process 500 may further include receiving the eMBMS service schedule (block 520). The operation of block 520 may be similar to that of block 460 (FIG. 4). For example, small cell 220 may, for example, receive the signaling message and may extract the included dates and times of the scheduled eMBMS transmissions; the areas, macrocells, or other information that indicates geographic information associated with the eMBMS transmissions; and the identification of the service bands associated with the eMBMS transmissions.

Process 500 may further include determining whether the small cell will interfere with an eMBMS service transmission (block 530). The operation of block 530 may be similar to that of block 470 (FIG. 4). As discussed, small cell 220 may compare the location of the small cell with the geographic information associated with the eMBMS schedule. Small cell 220 may also compare the current frequency band, being used by the small cell for unicast transmission, to the frequency band for the scheduled eMBMS service. Based on these comparisons, small cell 220 may determine whether interference with an upcoming eMBMS transmission is likely.

Process 500 may further include determining whether the measured macrocell signal strength is above a threshold (block 540). The threshold may be set at a level below which eMBMS service may be deemed to be inadequate. Thus, small cell 220 may determine whether eMBMS transmissions are possible within small cell 220.

Process 500 may further include re-provisioning, when the small cell is determined to interfere with eMBMS service and the measured signal strength is above the threshold, the small cell to use a frequency band that is different than the frequency band of the eMBMS service (block 550). Thus, small cell 220 may re-provision itself to change the LTE unicast serving band to a band that is not the same band as the one on which the eMBMS service is scheduled to operate. If the result of block 540 indicates that the macrocell signal strength is not above the threshold, block 550 may effectively operate to cause small cell 220 to refrain from re-provisioning the frequency band, despite the fact that small cell 220 is using the same frequency band as a scheduled eMBMS transmission, when the signal strength of the eMBMS transmission is not strong enough to be useful to UEs in small cell 220.

Some small cells 220 may be implemented in such a way that the small cell is unable to use an alternate frequency band. For example, the small cell may only be capable of using a single frequency band or the alternate possible frequency bands that are supported by the small cell may be unusable for other reasons (e.g., the alternate frequency bands may be in use by other devices or for other purposes).

Figure 6:
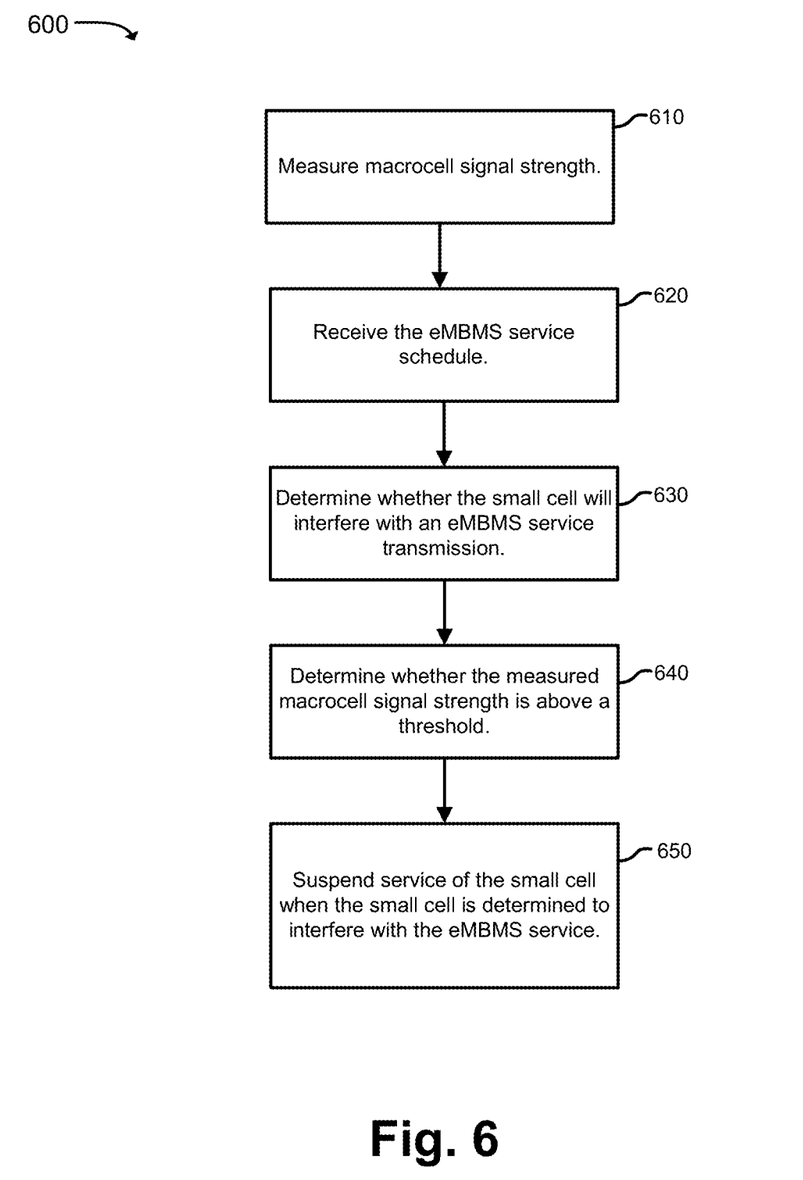

FIG. 6 is a flowchart illustrating an example process 600, according to another implementation, for mitigating interference to eMBMS services in a HetNet. In one implementation, the process of FIG. 6 may be implemented by a small cell 220.

Process 600 may include operations, shown in blocks 610-640, that are generally similar to those in blocks 510-540, respectively. Accordingly, these blocks will not be described in detail. As shown, the operations of blocks 610-640 may include: measuring the signal strength associated with a macrocell (block 610); receiving the eMBMS service schedule (block 620); determining whether the small cell will interfere with an eMBMS service transmission (block 630); and determining whether the measured macrocell signal strength is above a threshold (block 640).

Process 600 may further include suspending service of the small cell (block 650). Service may be suspended when the small cell is determined to interfere with the eMBMS service (block 650). In some implementations, one or more additional factors may be used to determine to suspend service. For example, in one implementation, service may be suspended when the small cell is determined to interfere with the eMBMS service and when the measured macrocell signal strength is above a threshold.

In some implementations, one or more other criteria may additionally or alternatively be used, in place of or in addition to the measured macrocell signal strength, to determine whether to suspend service by the small cell. For example, small cell 220 may determine whether to suspend service based on the current unicast load of small cell 220 relative to the excess unicast capacity of macrocell 210. In particular, in one implementation, small cell 220 may make the determination of whether to suspend service based on a determination of whether the average load of the small cell is less than MIN(Static Traffic Thresh, Excess Macro Capacity); where MIN refers to the "minimum" operation, Static Traffic Thresh is a predetermined threshold value relating to user load, and Excess Macro Capacity refers to the current excess unicast capacity of macrocell 210. Thus, in this implementation, small cell 220 may determine to suspend service only when the macrocell (that serves the area overlapping the small cell) has enough spare capacity to handle the load that is currently being handled by the small cell. That is, small cell service may only be disabled if the macro signal in the area can provide essential services (voice, minimum required data rates) during the small cell interruption. Alternatively or additionally, instead of making the determination based on the average load of the small cell, other performance metrics may be used, such as the user count (e.g., number of attached UEs 310), traffic volume, and/or resource block loading metrics.

In some implementations, instead of suspending service (block 650), small cell 220 may reduce transmit power. The reduction in transmit power may be triggered based on the detection of eMBMS services, after which regular power levels could be re-instated. Each small cell 220 may determine appropriate levels of transmit power based on an estimate of macrocell interference.

Figure 7:
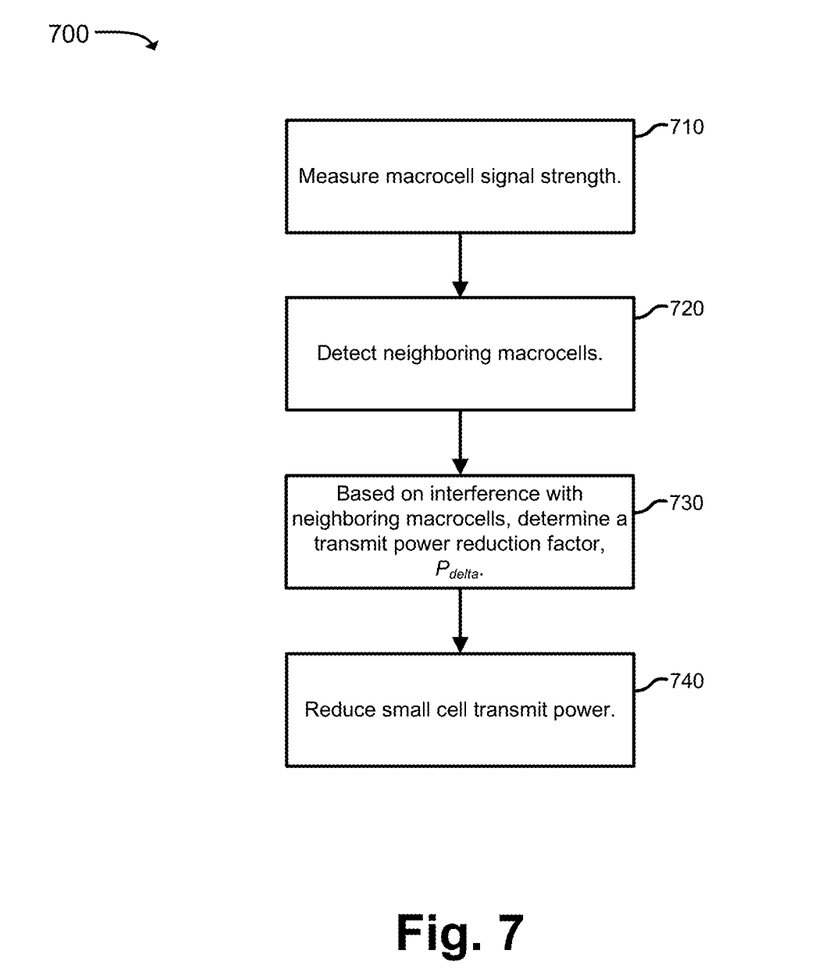

FIG. 7 is a flowchart illustrating an example process 700, according to another implementation, for mitigating interference to eMBMS services in a HetNet. The mitigation may be performed by selectively reducing small cell transmit power. In one implementation, the process of FIG. 7 may be implemented by a small cell 220.

Process 700 may include measuring the macrocell signal strength (block 710). The measurement of the macrocell signal strength may be performed similarly to the macrocell signal strength measurements described in blocks 510 and 610.

Process 700 may further include detecting neighboring macrocells (block 720). The neighboring macrocells, for a particular small cell, may be dynamically detected by the measured signal strengths of the macrocells. In one implementation, the macrocell signal strengths, corresponding to a number of macrocells, may be sorted to obtain a ranked list (e.g., "nearer" macrocells will be at the top of the list). The macrocells near the top of the ranked list may be assumed to be macrocells that are most likely to interfere with the small cell.

Process 700 may further include, based on interference with neighboring macrocells, determining a transmit power reduction factor, $P_{delta}$ delta (block 730). In some implementations, interference may be determined using the eMBMS service schedule, which may be received as previously described (e.g., with respect to FIGS. 4B, 5, and 6). Potential interference with macrocell eMBMS services may be determined based on the eMBMS service schedule and based on the ranked list of macrocell signal strengths. The transmit power reduction factor may only be needed when the small cell is determined to interfere with the eMBMS service.

In one implementation, $P_{delta}$ delta may be set statically, such as during provisioning of small cell 220 or at another time. Alternatively, $P_{delta}$ delta may be dynamically determined by small cell 220 based on an estimate of the amount of interference. In some implementations, the interference estimate may be an estimate that is made for the handover border of the small cell and the macrocell. Alternatively or additionally, $P_{delta}$ delta may be determined based on small cell signal levels that are included in reports that are received from UEs 310 that are connected to small cell 220. UE reports may be triggered when a handover is performed from macrocell 210 to small cell 220. In one implementation, $P_{delta}$ delta may be calculated based on: MacroSignal−SmallCellSignal+Margin; where MacroSignal refers to a measurement of the macrocell signal strength, SmallCellSignal refers to the small cell signal strength, and Margin refers to a configurable parameter that is set based on the degree of signal quality desired at the macrocell edge.

Process 700 may further include reducing the small cell transmit power (block 740). The reduction may be based on the normal small cell transmit power multiplied by $P_{delta}$.

By reducing the small cell signal power, as described with respect to process 700, the small cell footprint can be dynamically reduced to a level required in a given deployment. The small cell coverage can be automatically adjusted based on exterior penetration losses and handovers can be designed to occur within a building, thereby mitigating the extent of interference imposed on eMBMS macrocell service.

Figure 8:
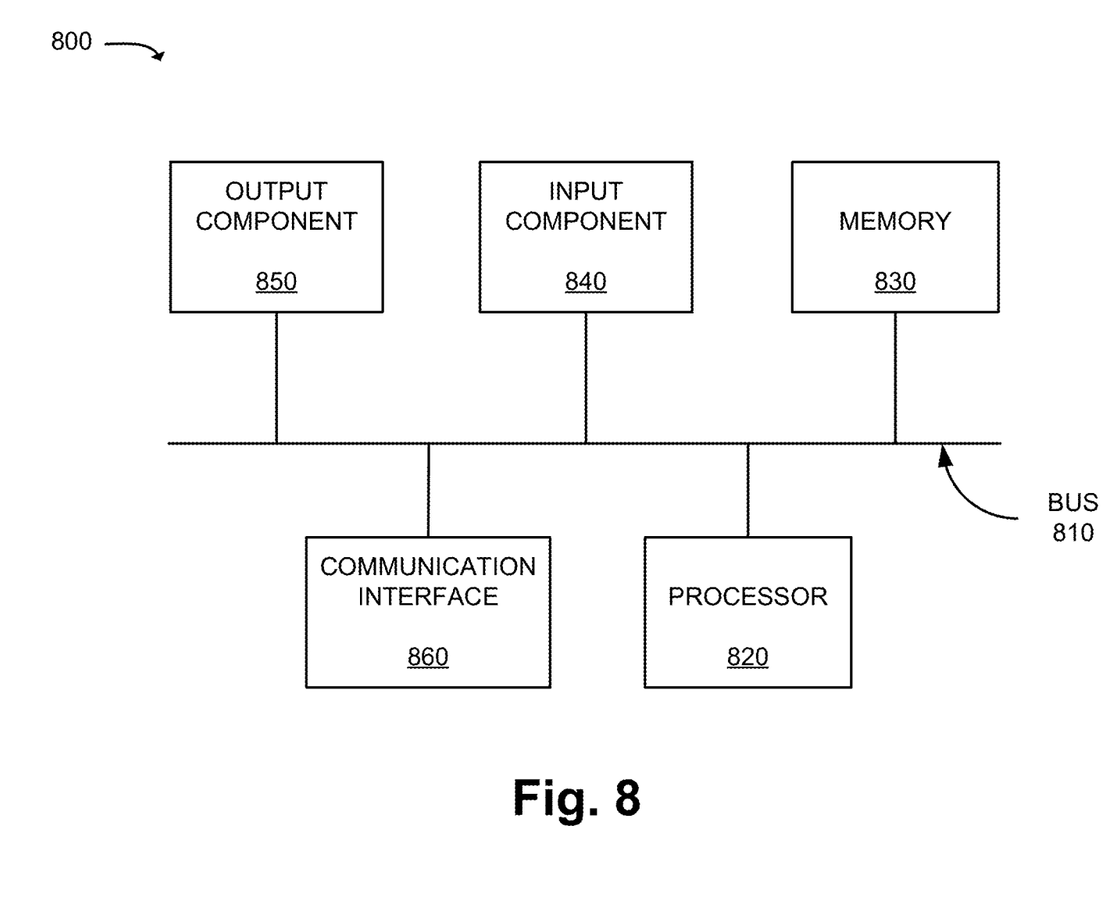
FIG. 8 is a diagram of example components of an example device.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

When device 800 represents a small cell, communication interface 860 may include one or more radio transceivers to transmit and receive data. Communication interface 860 may additionally include a passive "sniffing" receiver to measure received signal strength.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4A, 4B, 5, and 6, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold." or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A small cell radio node including:
    a non-transitory computer-readable medium containing program instructions; and
    one or more processors to execute the program instructions to:
        operate at a first frequency band;
        receive an enhanced Multimedia Broadcast Multicast Service (eMBMS) service schedule indicating upcoming macrocell eMBMS transmissions, the service schedule including:
            an indication of a geographic coverage area for the eMBMS transmission;
        determine, based on the eMBMS service schedule, whether the operation of the small cell radio node will interfere with a scheduled eMBMS transmission, the determining including:
            comparing, as a first comparison, the first frequency band to a second frequency band that corresponds to a frequency band that is to be used for the scheduled eMBMS transmission, and
            comparing, as a second comparison, the geographic coverage area for the eMBMS transmission to a geographic coverage area of the small cell radio node; and
        re-provision, by the small cell radio node and when the determination, based on the first and the second comparisons, indicates that the small cell radio node will interfere with the scheduled eMBMS transmission, the first frequency band that is in use by the small cell radio node to a frequency band that is different than the first frequency band.

2. The small cell radio node of claim 1, wherein the one or more processors are further to execute the program instructions to:
    re-provision, when the scheduled eMBMS transmission is complete, the frequency band of the small cell to use the first frequency band.

3. The small cell radio node of claim 1, wherein the one or more processors are further to execute the program instructions to:
    measure macrocell signal strength corresponding to one or more neighboring macrocells; and refrain from re-provisioning the first frequency band that is used by the small cell when the measured macrocell signal strength is below a threshold value.

4. The small cell radio node of claim 1, wherein the small cell radio node includes a femtocell.

5. A small cell radio node including:
a non-transitory computer-readable medium containing program instructions; and
one or more processors to execute the program instructions to:
receive an enhanced Multimedia Broadcast Multicast Service (eMBMS) service schedule indicating upcoming macrocell eMBMS transmissions, the service schedule including:
an indication of a geographic coverage area for the eMBMS transmission;
determine, based on the eMBMS service schedule, whether the small cell radio node will interfere with a scheduled eMBMS transmission, the determining including:
comparing, as a first comparison, a first frequency band, that corresponds to a frequency band that is in use by the small cell radio node, to a second frequency band that corresponds to a frequency band that is to be used for the scheduled eMBMS transmission, and
comparing, as a second comparison, the geographic coverage area for the eMBMS transmission to a geographic coverage area of the small cell radio node; and
modify, by the small cell radio node and when the determination, based on the first and the second comparisons, indicates that the small cell radio node will interfere with the scheduled eMBMS transmission, operation of the small cell radio node, with respect to the first frequency band, to switch the first frequency band that is in use by the small cell radio to a frequency band that does not interfere with the scheduled eMBMS transmission.

6. The small cell radio node of claim 5, wherein the modification of the operation of the small cell radio node includes suspending service of the small cell radio node during a period corresponding to the scheduled eMBMS service.

7. The small cell radio node of claim 6, wherein the one or more processors are further to:
measure a signal strength of the macrocell; and
refrain from suspending service of the small cell radio node when the measured signal strength is below a threshold.

8. The small cell radio node of claim 7, wherein the signal strength of the macrocell is estimated at a location corresponding to a handover border of the macrocell and the small cell radio node.

9. The small cell radio node of claim 5, wherein the modification of the operation of the small cell radio node includes reducing a transmit power of the small cell radio node during a period corresponding to the scheduled eMBMS service.

10. A system comprising:
a macrocell in a cellular network; and
a small cell in the cellular network, the small cell including:
a memory device storing a set of processor-executable instructions; and
a processor configured to execute the processor-executable instructions, wherein executing the processor-executable instructions causes the small cell to:
receive an enhanced Multimedia Broadcast Multicast Service (eMBMS) service schedule indicating upcoming eMBMS transmissions by the macrocell, the service schedule including:
an indication of a geographic coverage area for the eMBMS transmission;
determine, based on the eMBMS service schedule, whether the small cell will interfere with a scheduled eMBMS transmission, the determining including
comparing, as a first comparison, a first frequency band, that corresponds to a frequency band that is in use by the small cell, to a second frequency band that corresponds to a frequency band that is to be used for the scheduled eMBMS transmission, and
comparing, as a second comparison, the geographic coverage area for the eMBMS transmission to a geographic coverage area of the small cell radio node; and
modify, when the determination, based on the first and second comparisons, indicates that the small cell will interfere with the scheduled eMBMS transmission, operation of the small cell, with respect to the first frequency band, to switch the first frequency band that is in use by the small cell radio to a frequency band that does not interfere with the scheduled eMBMS transmission.

11. The system of claim 10, wherein the modification of the operation of the small cell includes suspending service of the small cell during a period corresponding to the scheduled eMBMS service.

12. The system of claim 11, wherein executing the processor-executable instructions further causes the small cell to:
measure a received signal strength of the macrocell; and
refrain from suspending service of the small cell when the measured signal strength is below a threshold.

13. The system of claim 10, wherein the modification of the operation of the small cell includes reducing a transmit power of the small cell during a period corresponding to the scheduled eMBMS service.

14. The small cell radio of claim 1, wherein the service schedule additionally includes dates, times, and durations of the upcoming eMBMS transmissions, and wherein the determination of whether the operation of the small cell radio node will interfere with a scheduled eMBMS transmission is additionally based on the dates, times, and durations of the upcoming eMBMS transmissions.

15. The small cell radio of claim 5, wherein the service schedule additionally includes dates, times, and durations of the upcoming eMBMS transmissions, and wherein the determination of whether the operation of the small cell radio node will interfere with a scheduled eMBMS transmission is additionally based on the dates, times, and durations of the upcoming eMBMS transmissions.

16. The system of claim 10, wherein the service schedule additionally includes dates, times, and durations of the upcoming eMBMS transmissions, and wherein the determination of whether the operation of the small cell radio node will interfere with a scheduled eMBMS transmission is additionally based on the dates, times, and durations of the upcoming eMBMS transmissions.

* * * * *